United States Patent
Bani Milhim et al.

(10) Patent No.: US 12,045,122 B2
(45) Date of Patent: Jul. 23, 2024

(54) DOUBLE OPEN CAN BUS WIRE FAULT IDENTIFICATION

(71) Applicant: GM GLOBAL TECHNOLOGY OPERATIONS LLC, Detroit, MI (US)

(72) Inventors: Alaeddin Bani Milhim, Pickering (CA); Hamed Kazemi, Scarborough (CA); Natalie A. Wienckowski, Sterling Heights, MI (US); Hadyan Sani Ramadhan, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 18/063,147

(22) Filed: Dec. 8, 2022

(65) Prior Publication Data

US 2024/0193028 A1  Jun. 13, 2024

(51) Int. Cl.
| | |
|---|---|
| *G06F 11/00* | (2006.01) |
| *G06F 11/07* | (2006.01) |
| *G06F 11/16* | (2006.01) |
| *G06F 11/22* | (2006.01) |

(52) U.S. Cl.
CPC ...... *G06F 11/0763* (2013.01); *G06F 11/0745* (2013.01); *G06F 11/1625* (2013.01); *G06F 11/221* (2013.01)

(58) Field of Classification Search
CPC ............. G06F 11/0745; G06F 11/0763; G06F 11/1625; G06F 11/221
See application file for complete search history.

(56) References Cited

U.S. PATENT DOCUMENTS

| | | | | |
|---|---|---|---|---|
| 8,015,445 B2* | 9/2011 | Ando | .................. | H04L 43/0823 714/25 |
| 2015/0346259 A1* | 12/2015 | Jiang | ................ | H04L 12/40006 324/538 |
| 2023/0269111 A1* | 8/2023 | van Dijk | ............. | G06F 11/0745 375/219 |

OTHER PUBLICATIONS

Xia, Shanpeng et al., Fault Diagnosis and Analysis of Automobile CAN Bus Communication, 2022, IEEE (Year: 2022).*

* cited by examiner

*Primary Examiner* — Marc Duncan
(74) *Attorney, Agent, or Firm* — Lorenz & Kopf, LLP

(57) ABSTRACT

A method for determining a two wire open fault on a two wire communications bus including determining a threshold in response to a first data from a first electronic control unit and a second data received from a second electronic control unit via the two wire communications bus, wherein the first data includes a first plurality of dominant bits and a first plurality of recessive bits and the second data includes a second plurality of dominant bits and a second plurality of recessive bits, determining a current network health indicator in response to a third data from the first electronic control unit having a third plurality of dominant bits and a third plurality of recessive bits, and generating a double wire open fault error report in response to the current network health indicator exceeding the threshold.

20 Claims, 4 Drawing Sheets

DOUBLE OPEN CAN BUS WIRE FAULT IDENTIFICATION

INTRODUCTION

The present disclosure generally relates to vehicle system fault diagnosis, and more particularly relates to a method and apparatus for identifying a double open wire CAN bus fault in response to CAN bus signal characteristics.

The Controller Area Network (CAN bus) is the nervous system of vehicle electronics and control systems, enabling communication between different vehicle sensors and controllers. The CAN bus consists of two dedicated wires for point to point communications between vehicle devices. These wires are typically identified as CAN high (CAN_H) and CAN low (CAN_L). When the CAN bus is in idle mode or is transmitting recessive bits, both of these lines carry a nominal 2.5V. When dominant data bits are being transmitted, the nominal CAN_H voltage is 3.5 V with a range of 2.75V to 4.5V and the nominal CAN_L voltage is 1.5 V with a range of 0.5 V to 2.25 V. The nominal differential voltage when transmitting dominant bits is 2.0 V with a range of 1.5 V to 3.0V. This generates a voltage differential between the two lines, such that the CAN bus has reduced sensitivity to inductive spikes, electrical fields or other noise. This allows the CAN bus to be resilient in an electrically noisy environment, like a vehicle. Using twisted-pairs makes it even more robust. Typically, devices are connected in parallel with the CAN bus lines and the lines are terminated with a nominal 120Ω resistance at each end. This may be a single resistor or multiple resistors with a capacitor.

A problem exists when one or more of the lines are broken. Devices that are connected before the break may have distorted signals due to the increase in termination resistance. Communication between devices separated by one broken line may still communicate under some conditions, usually with an increased error rate. When two lines are broken communications may be lost between devices separated by the break and distorted between devices not separated by the break due to the change in termination resistance. Difficulty arises when trying to troubleshoot communication errors with the CAN bus and CAN bus devices as some may be communicating error free, some may be communicating with increased error rates, and some may not be in communication at all. Accordingly, it is desirable to address the aforementioned problems and to provide systems and methods for providing a double open bus wire fault detection method for a CAN bus communications network. Furthermore, other desirable features and characteristics of the present disclosure will become apparent from the subsequent detailed description and the appended claims, taken in conjunction with the accompanying drawings and the foregoing technical field and background.

SUMMARY

Vehicle fault diagnosis systems are provided for determining a double open bus wire fault in a CAN bus communications network. In one embodiment, a CAN bus diagnostic system includes a two wire communications bus, a first electronic control unit configured to transmit a first data via the two wire communications bus, wherein the first data includes a first plurality of dominant bits and a first plurality of recessive bits, a second electronic control unit configured to transmit a second data via the two wire communications bus, wherein the second data includes a second plurality of dominant bits and a second plurality of recessive bits, and a processor configured to determine a two wire open fault on the two wire communications bus in response to a bit intensity and a bit variation of a third plurality of recessive bits received from the first electronic control unit.

In accordance with another exemplary embodiment, the two wire open fault on the two wire communications bus is further determined in response to an absence of an expected data from the second electronic control unit.

In accordance with another exemplary embodiment, the two wire open fault is determined in response to a ratio of the bit intensity and the bit variation of the third plurality of recessive bits.

In accordance with another exemplary embodiment, the processor is further operative to generate a threshold in response to the first data and the second data and wherein the two wire open fault is generated in response to a current network health indicator determined in response to the bit intensity and the bit variation of the third plurality of recessive bits being greater than the threshold.

In accordance with another exemplary embodiment, the processor is further operative to generate a threshold in response to the first plurality of recessive bits and the second plurality of recessive bits and wherein the two wire open fault is generated in response to a current network health indicator determined in response to a ratio of the bit intensity and the bit variation of the third plurality of recessive bits being greater than the threshold.

In accordance with another exemplary embodiment, the two wire open fault is generated in response to a deviation of a first ratio of the bit intensity and the bit variation of the third plurality of recessive bits from a threshold ratio determined under a non-fault operating condition.

In accordance with another exemplary embodiment, the two wire open fault is generated in response to a moving mean of recessive bit variation of the second plurality of recessive bits being greater than a moving mean of recessive bit variation of the first plurality of recessive bits.

In accordance with another exemplary embodiment, the two wire open fault is generated in response to a moving mean of the bit intensity of the second plurality of recessive bits being greater than a moving mean of the bit intensity of the first plurality of recessive bits.

In accordance with another exemplary embodiment, they system includes a user interface for receiving the two wire open fault and presenting an alert to a user indicative of the two wire open fault.

In accordance with another exemplary embodiment, a method for determining a two wire open fault on a two wire communications bus includes determining a threshold in response to a first data from a first electronic control unit and a second data received from a second electronic control unit via the two wire communications bus, wherein the first data includes a first plurality of dominant bits and a first plurality of recessive bits and the second data includes a second plurality of dominant bits and a second plurality of recessive bits, determining a current network health indicator in response to a third data from the first electronic control unit having a third plurality of dominant bits and a third plurality of recessive bits, and generating a double wire open fault error report in response to the current network health indicator exceeding the threshold.

In accordance with another exemplary embodiment, the current network health indicator is determined in response to a bit intensity and a bit variation of the third plurality of recessive bits.

In accordance with another exemplary embodiment, the two wire communications bus is a controller area network in a vehicle application.

In accordance with another exemplary embodiment, the current network health indicator is determined in response to not receiving an expected data from the second electronic control unit.

In accordance with another exemplary embodiment, the threshold is updated in response to receiving a fourth data from the second electronic control unit and the third data.

In accordance with another exemplary embodiment, wherein determining the current network health indicator is performed by a diagnostic processor coupled to the two wire communications bus.

In accordance with another exemplary embodiment, the method is further operative to generate an unknown fault in response to the current network health indicator being less than the threshold.

In accordance with another exemplary embodiment, the current network health indicator is determined in response to a ratio of a bit intensity and a bit variation of the third plurality of recessive bits.

In accordance with another exemplary embodiment, the double wire open fault error report is generated in response to a moving mean of recessive bit intensity of the third plurality of recessive bits being greater than a moving mean of recessive bit intensity of the second plurality of recessive bits and the first plurality of recessive bits.

In accordance with another exemplary embodiment, a method of determining a two wire communications bus fault includes receiving, from a first network device, a first data having a first plurality of recessive bits, determining a recessive bit intensity and a recessive bit variation in response to the first plurality of recessive bits, calculating a network health indicator in response to a ratio of the recessive bit intensity and the recessive bit variation, generating a two wire open fault alert in response to the network health indicator exceeding a threshold, and displaying the two wire open fault alert to a user.

In accordance with another exemplary embodiment, the method includes receiving a second data having a second plurality of recessive bits, receiving a third data having a third plurality of recessive bits, and calculating the threshold in response to the second plurality of recessive bits and the third plurality of recessive bits.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
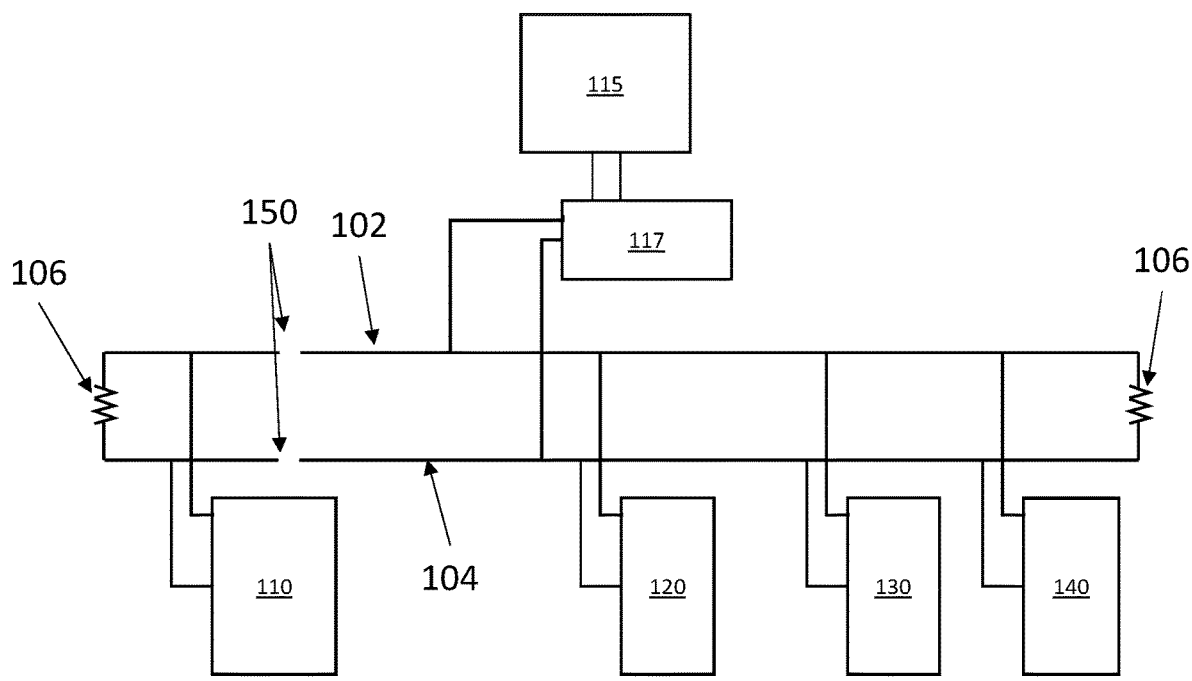
FIG. 1 shows an exemplary environment for use of a method and system for double open bus wire fault detection in a CAN bus communications network in accordance with various embodiments.

Turning now to FIG. 1, an exemplary environment 100 for use of a method and system for double open bus wire fault detection in a CAN bus communications network is shown in accordance with various embodiments. The exemplary environment 100 includes a CAN high wire 102, a CAN low wire 104, a first node 110, a second node 120, a third node 130, a fourth node 140, terminating resistors 106, an OBDII port 117, and a diagnostic processor 115. The exemplary environment 100 is further illustrative of a double CAN wire break 150 in the CAN high wire 102 and the CAN low wire 104.

Instances of double open CAN faults where both the CAN high wire 102 and the CAN lower wire 104 are broken, which may be caused by a broken ECU connector or the like, are one of the most challenging problems to be diagnosed as the voltage profile can be easily mistaken with that of a quieter normal CAN bus. Double open CAN faults result in disabled CAN bus communication and can require long intensive troubleshooting to identify the fault. Besides isolating two portions of the CAN bus from each other, double open CAN faults will result in increased termination impedance and reduced current resulting in unexpected CAN bus line voltages. This problem is exacerbated in larger networks with more noise and increased node impedances making detection of a double open CAN fault more difficult.

A double open fault occurrence results in an incomplete CAN circuit causing high voltage level fluctuation of the CAN signal voltages. A double open fault occurrence can be determined by examining the CAN voltage time constant or the transition time between the dominant and recessive bits. In addition, a double open fault will isolate some nodes from other nodes, such as node 1 110 being isolated from the other nodes 120, 130, 140 in this exemplary embodiment. These isolated nodes will appear to have ceased communications on the CAN bus which results in the bus having less traffic as opposed to a normal health state.

The diagnostic processor 115 can be employed to distinguish between double open CAN fault and normal bus state by analyzing the recessive bit intensity and variation. Double open faults can result in disabled ECU communication, high voltage level fluctuation, and longer transition time between the dominant and recessive bits. The diagnostic processor 115 may monitor the CAN bus recessive bit intensity and variation in real-time to generate health indicators to estimate state-of-health of CAN bus with respect to double open fault based on real-time CAN voltage data. The diagnostic processor 115 may generate a health indicator based on the recessive bit intensity indicator and recessive bit variation indicator using weighting factors. This fused health indicator can be matured over time and then compared to a predefined health threshold. A user alert or other system error may be generated in response to the fused health indicator dropping below a predefined health threshold or a deviation between the fused health indicator and a prior fused health indicator determined during normal CAN bus operations exceeding a threshold. The diagnostic processor 115 may be further configured to adaptively learn normal bus state behavior to later detect abnormal bus state behavior indicative of a double open CAN fault state.

The diagnostic processor 115 may be integral to the CAN bus network or embedded in the Central Gateway Module (CGM) as opposed to being a removable diagnostic tool coupled to the OBDII port 117. In some exemplary embodiments, the diagnostic processor 115 may perform a CAN vehicle health assessment continuously or according to a predefined schedule. For example, the CAN vehicle health assessment can be performed at regular time intervals, such as every three seconds or the like. The diagnostic processor 115 can determine if all nodes on the CAN bus network are communicating. If all nodes are communicating, the diagnostic processor 115 may determine that there is no double open CAN fault and may then calculate a fused health indicator and a state of health threshold in response to the calculated fused health indicator. In some exemplary embodiments, the fused health indicator may be the quotient of the recessive bit intensity divided by the recessive bit variation.

If the diagnostic processor 115 does not detect all of the nodes communicating on the CAN bus, the diagnostic processor 115 may then determine if there are any known CAN wiring faults, such as short to ground or the like. If a known fault is determined, the diagnostic processor 115 reports the known fault and ends the diagnostic process for the current cycle. If no known fault is determined, the diagnostic processor 115 can calculate a current fused health indicator and determine a fused health indicator deviation from the health CAN bus state. If the fused health indicator deviation exceeds a threshold value, a double open fault is reported. If the fused health indicator deviation does not exceed the threshold value, an unknown fault is reported and the diagnostic process for the current cycle is ended.

Figure 2:
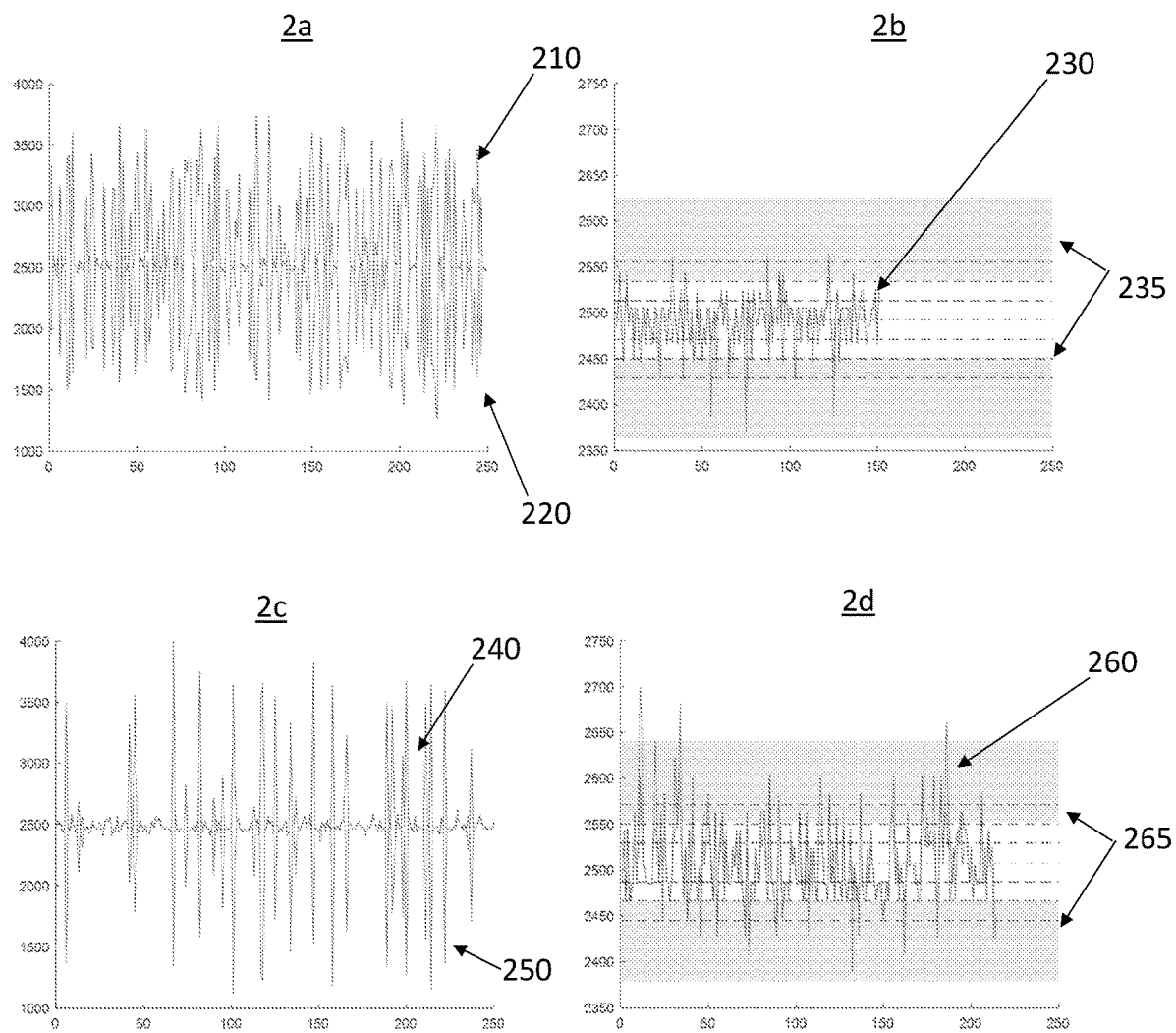
FIG. 2 shows a plurality of graphs illustrative of exemplary CAN bus signal voltages and recessive bit intensities for normal CAN bus operation and double open fault CAN bus operation in accordance with various embodiments.

Turning now to FIG. 2, graphs 2a, 2b, 2c, and 2d are illustrative of exemplary CAN bus signal voltages and recessive bit intensities for normal CAN bus operation and double open fault CAN bus operation in accordance with various embodiments. A double open CAN bus fault can be predicted by examining the variation of the recessive bits in the CAN bus signals. The normal CAN bus signal amplitude graph 2a is illustrative of a CAN bus high signal 210 transitioning between a recessive state at 2.5 volts and a dominant state at 2.75 to 4.5 volts and the CAN bus low signal 220 transitioning between recessive state at 2.5 volts and dominant state at 2.25 to 0.5 volts. Normal CAN bus signal recessive state variation 2b is shown to have relatively low variation.

The recessive bits of the normal CAN bus operation are analyzed and shown in graph 2b. During normal operation the CAN bus signals have predominantly recessive bit voltages close to the expected 2.5+/−0.2 volts. In some exemplary embodiments, 2.5+/−0.2 volts can be used as a recessive boundary for a healthy CAN bus. During normal CAN bus operation, the signal states transition from recessive to dominant more quickly with fewer values in the shaded recessive bit variation bands 235.

Graph 2c is illustrative of a double open CAN bus operation with a CAN bus high signal 240 and a CAN bus low signal 250. Initially, the double open CAN bus appears to look normal, but with fewer messages transmitted on the bus. In a double open CAN bus condition, some nodes may be isolated by the break and therefore any messages from these nodes are not detected by the diagnostic process. However, if there is a normal bus with low traffic, there will be fewer points in the recessive bit variation band than are present with a double open CAN bus condition.

Graph 2d illustrates the double open CAN bus operation recessive bit variation and recessive bit intensity. The recessive bit values between the normal operation shown in graph 2b and the double open CAN bus condition shown in graph 2d show a clear distinction. The double open CAN bus condition shows more recessive bits and less dominant bits and greater variation within the recessive bits.

Figure 3:
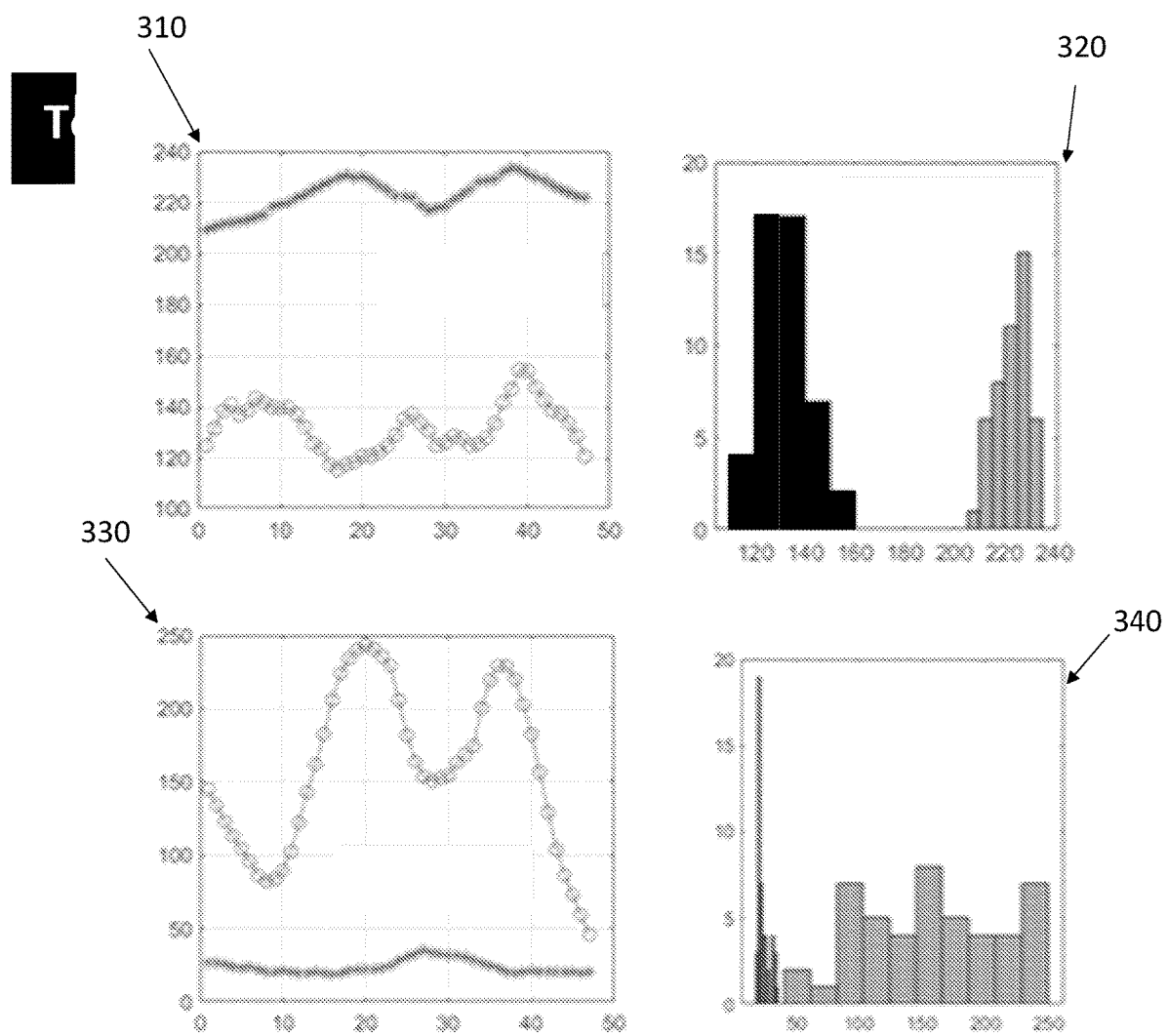
FIG. 3 shows a plurality of graphs illustrative of exemplary recessive bit analysis for normal CAN bus operation and double open fault CAN bus operation in accordance with various embodiments.

Turning now to FIG. 3, graphs 310, 320, 330, 340 illustrative of recessive bit analysis are shown in accordance with various embodiments. Moving mean of recessive bits intensity 310 shows the number of double open CAN bus recessive bits (upper curve) higher than that, and clearly separated from, those of the normal CAN bus operation (lower curve). Likewise, the histogram of the recessive bit intensity 320 shows the normal operation recessive bit intensity being lower than that of the double open CAN bus operation.

The moving mean of the recessive bit operation 330 shows greater bit fluctuation for the double open CAN bus operation than that of the normal CAN bus operation. Likewise, the histogram of the recessive bit variation 340 is lower for the normal CAN bus operation than that of the double open CAN bus operation.

Figure 4:
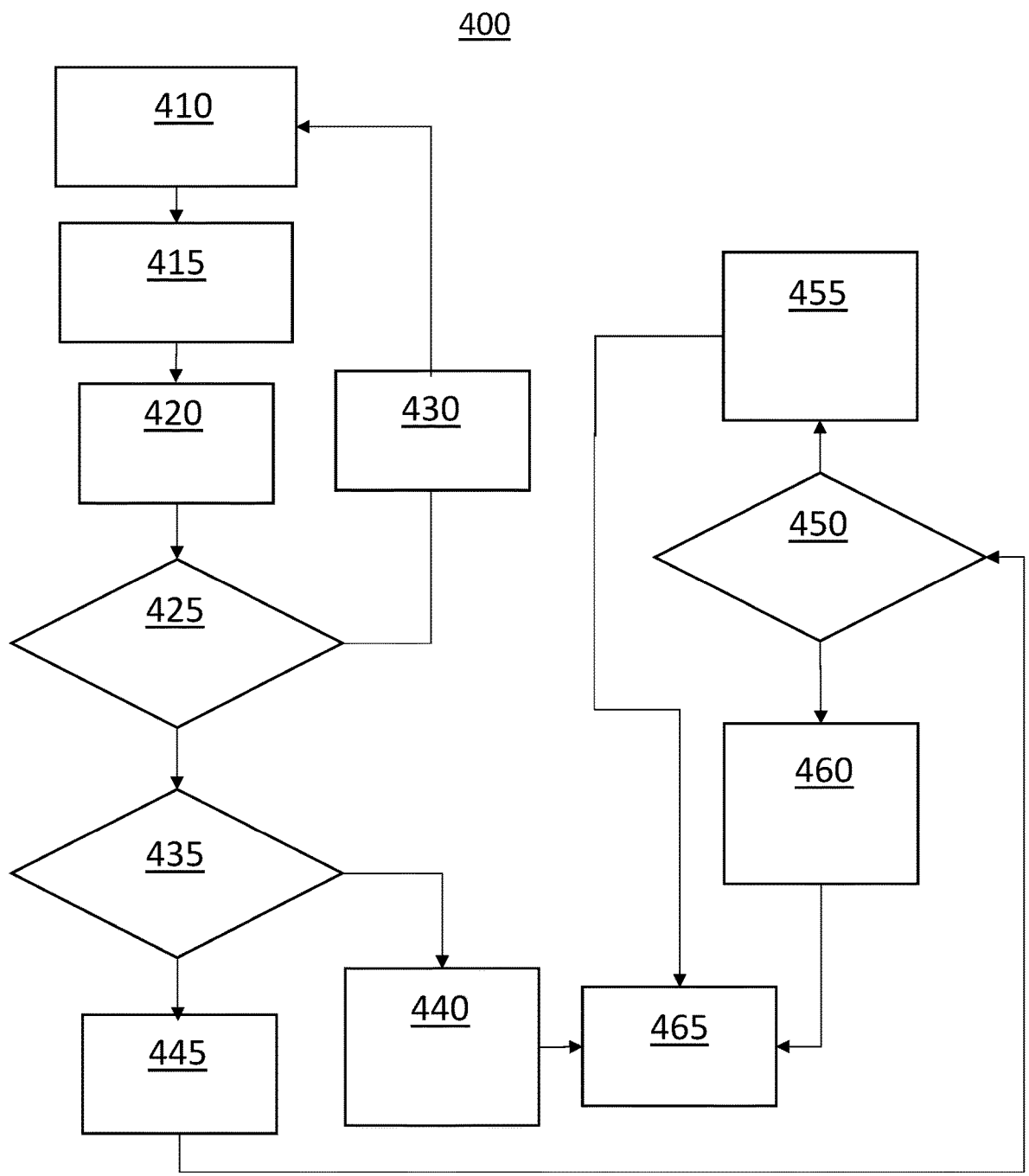
FIG. 4 shows a flow chart illustrating an exemplary method for detection of a double open bus wire fault in a CAN bus communications network according to various embodiments.

Turning now to FIG. 4, a flow chart illustrating an exemplary method 400 for detection of a double open bus wire fault in a CAN bus communications network according to an exemplary embodiment of the present disclosure is shown. In some exemplary embodiments, the method is first initiated in response to a CAN vehicle health assessment scheduler 410. The method may be initiated in response to a scheduled CAN vehicle health assessment or may be initiated in response to a control signal from a vehicle system controller or electronic control unit (ECU).

The method is next operative to calculate 415 a fused health indicator. The fused health indicator may be calculated in response to the recessive bit intensity and the recessive bit variation. In some exemplary embodiments, the fused health indicator can be the quotient of the recessive bit intensity divided by the recessive bit variation. Each of the recessive bit intensity and the recessive bit variation are used to estimate an occurrence of a double CAN bus fault.

The method is next operative to monitor 420 the ECU communications of the CAN bus network. If all the expected ECUs are communicating 425, the method is next operative to update 430 the CAN bus network state of health threshold in response to the calculated fused health indicator and all the ECUs communicating on the network. In some exemplary embodiments, it is assumed that if all the ECUs are communicating on the network, that there is no double fault present on the CAN bus communications network. After updating the health threshold in response to the indication of normal CAN bus operation, the method returns to waiting 410 for the next scheduled CAN vehicle health assessment. In some exemplary embodiments, the methodology intelligently learns an updated normal CAN bus state behavior to be used to detect a double open CAN bus fault state. The health indicator threshold can be continuously calculated and updated based on healthy CAN bus operation during different driving conditions.

In some exemplary embodiments, the method can calibrate the weighting factors in the fused health indicator based on the ECU communication status, the recessive bit intensity indicator and recessive bit variation indicator using weighting factors. For example, when some of the ECUs on the impacted bus are communicating, in response to both the number of recessive bits and an increase in the recessive bit variation. When none of the ECUs on the impacted bus are communicating, the number of recessive bits may be maximized and the recessive bit variation will be minimized. In addition, the fused health indicator can be matured over time in response to normal CAN bus operations. The health indicator threshold can be learned and updated based on different healthy driving conditions. This matured fused health indicator can be used to generate a threshold used to identify the fault state.

If one or more ECUs are not communicating, the method is next operative to check 435 for any known faults, such as short to ground, short to power, single open wire and/or improper grounding. If a known fault is detected or determined, the known fault is reported and the method is ended 465. If no known fault is detected or determined, the method is next operative to estimate 445 a fused health indicator deviation from the normal healthy CAN bus state. If the deviation exceeds the health threshold 450, the method is operative to report 460 the double open CAN bus fault. If the deviation does not exceed the health threshold 450, the method reports 455 an unknown fault. After reporting either the unknown fault or the double open fault, the method is ended 465.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A communications bus diagnostic system comprising:
    a two wire communications bus;
    a first electronic control unit configured to transmit a first data via the two wire communications bus, wherein the first data includes a first plurality of dominant bits and a first plurality of recessive bits;
    a second electronic control unit configured to transmit a second data via the two wire communications bus, wherein the second data includes a second plurality of dominant bits and a second plurality of recessive bits; and
    a processor configured to determine a two wire open fault on the two wire communications bus in response to a bit intensity and a bit variation of a third plurality of recessive bits received from the first electronic control unit.

2. The communications bus diagnostic system of claim 1 wherein the two wire open fault on the two wire communications bus is further determined in response to an absence of an expected data from the second electronic control unit.

3. The communications bus diagnostic system of claim 1 wherein the two wire open fault is determined in response to a ratio of the bit intensity and the bit variation of the third plurality of recessive bits.

4. The communications bus diagnostic system of claim 1 wherein the processor is further operative to generate a threshold in response to the first data and the second data and wherein the two wire open fault is generated in response to a current network health indicator determined in response to the bit intensity and the bit variation of the third plurality of recessive bits being greater than the threshold.

5. The communications bus diagnostic system of claim 1 wherein the processor is further operative to generate a threshold in response to the first plurality of recessive bits and the second plurality of recessive bits and wherein the two wire open fault is generated in response to a current network health indicator determined in response to a ratio of the bit intensity and the bit variation of the third plurality of recessive bits being greater than the threshold.

6. The communications bus diagnostic system of claim 1 wherein the two wire open fault is generated in response to a deviation of a first ratio of the bit intensity and the bit variation of the third plurality of recessive bits from a threshold ratio determined under a non-fault operating condition.

7. The communications bus diagnostic system of claim 1 wherein the two wire open fault is generated in response to a moving mean of recessive bit variation of the second plurality of recessive bits being greater than a moving mean of recessive bit variation of the first plurality of recessive bits.

8. The communications bus diagnostic system of claim 1 wherein the two wire open fault is generated in response to a moving mean of the bit intensity of the second plurality of recessive bits being greater than a moving mean of the bit intensity of the first plurality of recessive bits.

9. The communications bus diagnostic system of claim 1 further including a user interface for receiving the two wire open fault and presenting an alert to a user indicative of the two wire open fault.

10. A method for determining a two wire open fault on a two wire communications bus comprising:
    determining a threshold in response to a first data from a first electronic control unit and a second data received from a second electronic control unit via the two wire communications bus, wherein the first data includes a first plurality of dominant bits and a first plurality of recessive bits and the second data includes a second plurality of dominant bits and a second plurality of recessive bits;
    determining a current network health indicator in response to a third data from the first electronic control unit having a third plurality of dominant bits and a third plurality of recessive bits; and
    generating a double wire open fault error report in response to the current network health indicator exceeding the threshold.

11. The method for determining the two wire open fault on the two wire communications bus of claim 10 wherein the current network health indicator is determined in response to a bit intensity and a bit variation of the third plurality of recessive bits.

12. The method for determining the two wire open fault on the two wire communications bus of claim 10 wherein the two wire communications bus is a controller area network in a vehicle application.

13. The method for determining the two wire open fault on the two wire communications bus of claim 10 wherein the current network health indicator is determined in response to not receiving an expected data from the second electronic control unit.

14. The method for determining the two wire open fault on the two wire communications bus of claim 10 wherein the threshold is updated in response to receiving a fourth data from the second electronic control unit and the third data.

15. The method for determining the two wire open fault on the two wire communications bus of claim 10 wherein determining the current network health indicator is performed by a diagnostic processor coupled to the two wire communications bus.

16. The method for determining the two wire open fault on the two wire communications bus of claim 10 further operative to generate an unknown fault in response to the current network health indicator being less than the threshold.

17. The method for determining the two wire open fault on the two wire communications bus of claim 10 wherein the current network health indicator is determined in response to a ratio of a bit intensity and a bit variation of the third plurality of recessive bits.

18. The method for determining the two wire open fault on the two wire communications bus of claim 10 wherein the double wire open fault error report is generated in response to a moving mean of recessive bit intensity of the third plurality of recessive bits being greater than a moving mean of recessive bit intensity of the second plurality of recessive bits and the first plurality of recessive bits.

19. A method of determining a two wire communications bus fault comprising:
 receiving, from a first network device, a first data having a first plurality of recessive bits;
 determining a recessive bit intensity and a recessive bit variation in response to the first plurality of recessive bits;
 calculating a network health indicator in response to a ratio of the recessive bit intensity and the recessive bit variation;
 generating a two wire open fault alert in response to the network health indicator exceeding a threshold; and
 displaying the two wire open fault alert to a user.

20. The method of determining the two wire communications bus fault of claim 19 further including:
 receiving a second data having a second plurality of recessive bits;
 receiving a third data having a third plurality of recessive bits; and
 calculating the threshold in response to the second plurality of recessive bits and the third plurality of recessive bits.

* * * * *